US008687784B2

(12) United States Patent
Aaron et al.

(10) Patent No.: US 8,687,784 B2
(45) Date of Patent: Apr. 1, 2014

(54) DETERMINING LOCAL TIME IN A LOCATION OF A TELEPHONE

(75) Inventors: Thomas A. Aaron, Pflugerville, TX (US); Anil Kalavakolanu, Austin, TX (US); Loulwa Salem, Austin, TX (US); Stephen A. Schlachter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 13/195,565

(22) Filed: Aug. 1, 2011

(65) Prior Publication Data

US 2013/0034221 A1 Feb. 7, 2013

(51) Int. Cl.
- H04M 1/56 (2006.01)
- H04M 15/06 (2006.01)
- H04M 3/42 (2006.01)

(52) U.S. Cl.
USPC .................. 379/142.11; 379/207.12

(58) Field of Classification Search
USPC ................. 379/142.1, 201.1, 207.03, 207.12; 455/415, 456.1, 457
See application file for complete search history.

(56) References Cited

U.S. PATENT DOCUMENTS

| 6,751,483 | B1 | 6/2004 | Oh |
| 7,330,720 | B2 | 2/2008 | Hinz |
| 7,474,744 | B2 | 1/2009 | Janssen |
| 7,822,647 | B1 | 10/2010 | Mussman et al. |
| 8,374,628 | B1 * | 2/2013 | Nelissen et al. ........... 455/456.1 |
| 2004/0204002 | A1 | 10/2004 | Chen et al. |
| 2005/0175172 | A1 * | 8/2005 | Janssen ........................ 379/440 |
| 2006/0104428 | A1 | 5/2006 | Jin |
| 2007/0160076 | A1 | 7/2007 | Faber et al. |
| 2008/0172243 | A1 | 7/2008 | Kelly |
| 2008/0214149 | A1 | 9/2008 | Ramer et al. |
| 2008/0214152 | A1 | 9/2008 | Ramer et al. |
| 2008/0214155 | A1 | 9/2008 | Ramer et al. |
| 2008/0214156 | A1 | 9/2008 | Ramer et al. |
| 2008/0214157 | A1 | 9/2008 | Ramer et al. |
| 2008/0214162 | A1 | 9/2008 | Ramer et al. |
| 2008/0215428 | A1 | 9/2008 | Ramer et al. |
| 2008/0242279 | A1 | 10/2008 | Ramer et al. |
| 2008/0275785 | A1 | 11/2008 | Altberg et al. |
| 2009/0080635 | A1 | 3/2009 | Altberg et al. |
| 2009/0274287 | A1 | 11/2009 | Al-Duwaish |
| 2009/0327432 | A1 | 12/2009 | Augustine et al. |

(Continued)

OTHER PUBLICATIONS

U.S. Appl. No. 13/195,661, entitled "Determining an Availability Status of a Contact Being Called," filed Aug. 1, 2011.

(Continued)

*Primary Examiner* — Quoc D Tran
(74) *Attorney, Agent, or Firm* — Maeve L. McCarthy; Jason H. Sosa

(57) ABSTRACT

In a method for placing a telephone call, a first telephone receives a request to call a second telephone. The first telephone retrieves a user preference for obtaining location information of the second telephone or of a user of the second telephone. The first telephone obtains the location information from one of a plurality of sources based at least in part on an order of priority of the sources defined by the user preference. The plurality of sources include a social network program. The first telephone determines a local time in a geographical location identified from the location information. The first telephone displays the local time. The first telephone prompts for a decision whether to place the call to the second telephone.

12 Claims, 5 Drawing Sheets

(56) References Cited

U.S. PATENT DOCUMENTS

| | | | |
|---|---|---|---|
| 2010/0159942 A1* | 6/2010 | Lewis et al. | 455/456.1 |
| 2010/0246787 A1 | 9/2010 | Ray | |
| 2010/0254525 A1* | 10/2010 | Maly et al. | 379/207.03 |
| 2010/0312848 A1 | 12/2010 | Bakshi et al. | |
| 2011/0069661 A1* | 3/2011 | Waytena et al. | 370/328 |
| 2011/0088003 A1 | 4/2011 | Swink et al. | |
| 2011/0117878 A1 | 5/2011 | Barash et al. | |
| 2011/0130168 A1 | 6/2011 | Vendrow et al. | |
| 2011/0268262 A1 | 11/2011 | Jones et al. | |
| 2011/0268263 A1 | 11/2011 | Jones et al. | |
| 2011/0298618 A1* | 12/2011 | Stahl et al. | 340/573.1 |
| 2012/0003989 A1 | 1/2012 | Gravino | |

OTHER PUBLICATIONS

Non Final Office Action for U.S. Appl. 13/195,661, dated Apr. 3, 2012.

Response to Non Final Office Action for U.S. Appl. No. 13/195,661, dated Jun. 29, 2012, filed Jul. 2, 2012.

LBS Insight. "Disney Mobile's new Family Locator service will be powered by Autodesk's LocationLogic platform." Published May 17, 2006. Viktoriagatan 3, 411 25 Gothenburg, Sweden. <http://www.lbsinsight.com/?id=437>.

DNC Solutions. "Regulatory Information: Regulatory Charts" Published Mar. 9, 2010. <http://www3.dncsolution.com/marketing/reginfo/reginfo2.asp>.

Dial Connection. "DPTS Frequently Asked Questions." Date printed May 4, 2011 <http://www.dialconnection.com/products/dpts/faq.asp>.

International Calling Codes and World Time Zones. "Country Calling Codes, International Calling Made Easy!" Content Copyright 2000-2010 Domain-it! Date printed May 4, 2011 <http://www.countrycallingcodes.com/>.

"Convert USA + Canada phone codes to time zones." Date printed May 4, 2011 <http://wwp.areacodetime.com/>.

Wikipedia. "Local conventions for writing telephone numbers." Date printed May 5, 2011 <http://en.wikipedia.org/wiki/Local_conventions_for_writing_telephone_numbers>.

Commercial Systems Corporation. "Area Code Lookup—Look up Area Codes by City or State." Date printed May 5, 2011 <http://www.areacodes.org/>.

"Area Code Lookup," Date printed Feb. 3, 2011 <http://www.area-code-lookup.info/>.

"iPhone Apps—Area Code Info." Date printed Feb. 3, 2011 <http://www.apptism.com/apps/map-it-area-codes-by-time-zone>.

Beaumont, C., "Sniff: Social Network Integrated Friend Finder—Telegraph" The Telegraph. Jun. 13, 2008. © Copyright of Telegraph Media Group Limited 2013. <http://www.telegraph.co.uk/technology/3357568/Sniff-Social-Network-Integrated-Friend-Finder.html>.

"Location-based service—Wikipedia, the free encyclopedia." Wikipedia The Free Encyclopedia. Mar. 15, 2013. <http://en.wikipedia.org/wiki/Location-based_service>.

"Social network | Define Social network at Dictionary.com." Dictionary.com. Web. Apr. 18, 2013 (date accessed). Copyright 2013 Dictionary.com. <http://dictionary.reference.com/browse/social+network>.

"Social networking service—Wikipedia, the free encyclopedia." Wikipedia The Free Encyclopedia. Apr. 11, 2013. <http://en.wikipedia.org/wiki/Social_networking_service>.

"Social Network Integrated Friend Finder—What does Sniff stand for? Acronyms and abbreviations by the Free Online Dictionary." The Free Dictionary. Copyright 1988-2008 AcronymFinder.com. Web. Apr. 18, 2013 (date accessed). <http://acronyms.thefreedictionary.com/Social+Network°Integrated+Friend+Finder>.

Office Action from U.S. Appl. No. 13/195,661 dated Jul. 17, 2013.

Response filed on Sep. 30, 2013 in reply to Office Action dated Jul. 17, 2013, from U.S. Appl. No. 13/195,661.

* cited by examiner

DETERMINING LOCAL TIME IN A LOCATION OF A TELEPHONE

TECHNICAL FIELD

The present invention relates generally to wireless communication and more specifically to determining a local time in a location of a telephone.

BACKGROUND

Family, friends, and business contacts are often spread throughout the world. Calling a contact at certain times of the day may be inappropriate, depending on the time zone in which the contact and the contact's telephone are located. For example, a person located in New York City calling a contact in Beijing may not know that, because of the time zone difference, Beijing is twelve hours ahead of New York City. Therefore, calling the contact in Beijing from New York City may not be appropriate if the contact is not expecting the call, depending on the time the call is made.

A time zone, and in turn the current time, where the contact is located may be determined based on the area code of the phone number of the contact's telephone. A caller may use an Internet web site such as Verizon's Area Code Lookup page or a smart phone application such as Area Codes from VersaEdge Software LLC to determine a time zone, given an area code. Such an Internet web site or smart phone application must be accessed independently of making a telephone call, however. In other words, a caller must first look up an area code using either the Internet web site or the smart phone application before placing the call. This takes extra time and is inconvenient for the caller. Furthermore, the contact may be temporarily located in a different area code than that of the phone number of the contact's telephone at the time of the call. Similarly, a contact may choose to maintain a phone number with an area code different than the area code of the location where the contact permanently resides. In either scenario, a contact's area code may not be an accurate indication of the current location of the contact. A GPS signal of a contact's telephone may be used to determine a location of the contact's telephone, independent of the phone number of the contact's telephone. However, the GPS function of the contact's telephone may be disabled, or the contact's telephone may not have a clear connection to a GPS satellite.

SUMMARY

In a first embodiment of the present invention, there is a method for placing a telephone call. A first telephone receives a request to call a second telephone. The first telephone retrieves a user preference for obtaining location information of the second telephone or of a user of the second telephone. The first telephone obtains the location information from one of a plurality of sources based at least in part on an order of priority of the sources defined by the user preference. The plurality of sources include a social network program. The first telephone determines a local time in a geographical location identified from the location information. The first telephone displays the local time. The first telephone prompts for a decision whether to place the call to the second telephone.

In a second embodiment of the present invention, there is an apparatus for placing a call. The apparatus includes one or more processors, one or more computer-readable memories, and one or more computer-readable tangible storage devices. The apparatus further includes program instructions, stored on at least one of the one or more storage devices for execution by at least one of the one or more processors via at least one of the one or more memories, to receive a request to call a telephone. The apparatus further includes program instructions, stored on at least one of the one or more storage devices for execution by at least one of the one or more processors via at least one of the one or more memories, to retrieve a user preference for obtaining location information of the telephone or of a user of the telephone. The apparatus further includes program instructions, stored on at least one of the one or more storage devices for execution by at least one of the one or more processors via at least one of the one or more memories, to obtain the location information from one of a plurality of sources based at least in part on an order of priority of the sources defined by the user preference. The plurality of sources include a social network program. The apparatus further includes program instructions, stored on at least one of the one or more storage devices for execution by at least one of the one or more processors via at least one of the one or more memories, to determine a local time in a geographical location identified from the location information. The apparatus further includes program instructions, stored on at least one of the one or more storage devices for execution by at least one of the one or more processors via at least one of the one or more memories, to display the local time. The apparatus further includes program instructions, stored on at least one of the one or more storage devices for execution by at least one of the one or more processors via at least one of the one or more memories, to prompt for a decision whether to place the call to the telephone.

In a third embodiment of the present invention, there is a computer program product for placing a telephone call. The computer program product includes one or more computer-readable tangible storage devices. The computer program product further includes program instructions, stored on at least one of the one or more storage devices, to receive a request to call a telephone. The computer program product further includes program instructions, stored on at least one of the one or more storage devices, to retrieve a user preference for obtaining location information of the telephone or of a user of the telephone. The computer program product further includes program instructions, stored on at least one of the one or more storage devices, to obtain the location information from one of a plurality of sources based at least in part on an order of priority of the sources defined by the user preference. The plurality of sources include a social network program. The computer program product further includes program instructions, stored on at least one of the one or more storage devices, to determine a local time in a geographical location identified from the location information. The computer program product further includes program instructions, stored on at least one of the one or more storage devices, to display the local time. The computer program product further includes program instructions, stored on at least one of the one or more storage devices, to prompt for a decision whether to place the call to the telephone.

DETAILED DESCRIPTION

Figure 1:
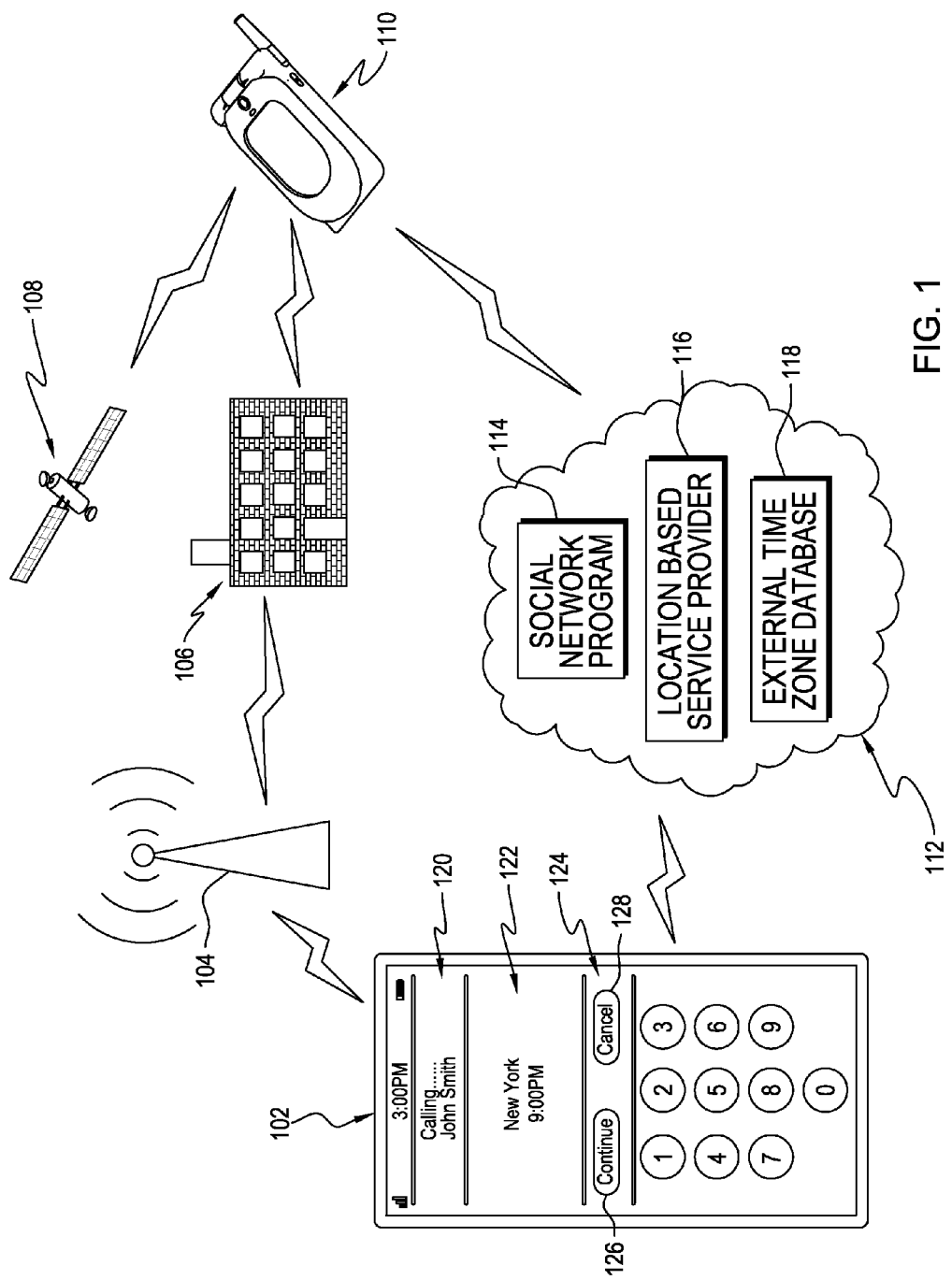
FIG. 1 illustrates a system for determining the local time in a location of a target telephone when placing a call from a telephone to the target telephone, according to an illustrative embodiment of the invention.

The present invention will now be described with reference to the figures. FIG. 1 illustrates a system for determining for determining a local time in a location of a target telephone 110 when placing a call from a telephone 102 to target telephone 110. Telephone 102 may be a wireless mobile telephone, a wired telephone, or any other device capable of making telephone calls to a contact. Similarly, target telephone 110 may be a wireless mobile telephone, a wired telephone, or any other device capable of receiving telephone calls.

Telephone 102 has a first display region 120 for displaying the name of the contact being called on target telephone 110. Telephone 102 has a second display region 122 for displaying the local time where the contact being called on target telephone 110 is currently located. For the purposes of this disclosure, it is assumed that target telephone 110 and the contact being called on target telephone 110 are concurrently located in the same location. In an example embodiment, second display region 122 may display the name of the city or the name of the country where the contact is currently located. In an example embodiment, second display region 122 has a background display image that varies based on the local time where the contact is currently located. For example, when the local time where the contact is currently located is 10:00 AM, the background display image is a bright sky with a sun, while the background display image is a dark sky with a moon when the local time where the contact is currently located is 10:00 PM.

Telephone 102 has a third display region 124, including a graphic representative of a continue button 126 for enabling the caller to proceed with placing the phone call to target telephone 110 based on information presented to the caller in second display region 122. Third display region 124 also includes a graphic representative of a cancel button 128 for enabling the caller to cancel the call to target telephone 110 based on information presented to the caller in second display region 122. It should be understood that, although continue button 126 and cancel button 128 have been described as being included in display region 124 as graphical representations, continue button 126 and cancel button 128 may also be physical buttons on telephone 102, in an example embodiment.

Telephone 102 is in communication with a cell tower 104 to retrieve a location of target telephone 110 from a telephone service provider 106 via a global positioning system (GPS) satellite 108. Telephone 102 is also in communication with a social network program 114, such as Facebook® or Twitter®, via a network 112, to retrieve a current location of the contact. In the embodiment illustrated in FIG. 1, network 112 is the Internet. However, one of skill in the art will appreciate that, in other embodiments, network 112 can be any type of network, such as a local area network (LAN), a wide area network (WAN), or an Intranet.

Telephone 102 is also in communication with a location based service provider (LBS) 116, such as Google Latitude™ or Foursquare®, via network 112, to retrieve a current location of the contact. Telephone 102 is also in communication with a time zone database 118, via network 112, to retrieve a time zone in which the contact is currently located, based on a determined area code or location. In one example embodiment, telephone 102 has an internal area code database (not shown) for retrieving a time zone in which the contact is currently located, based on a determined area code or location.

A local time program 220, stored on a computer 130 in communication with telephone 102 via network 112, is for determining a local time where the contact is currently located prior to placing a call to target telephone 110 of the contact. Local time program 220 can be downloaded to telephone 102 from computer 130 via network 112.

Figure 2:
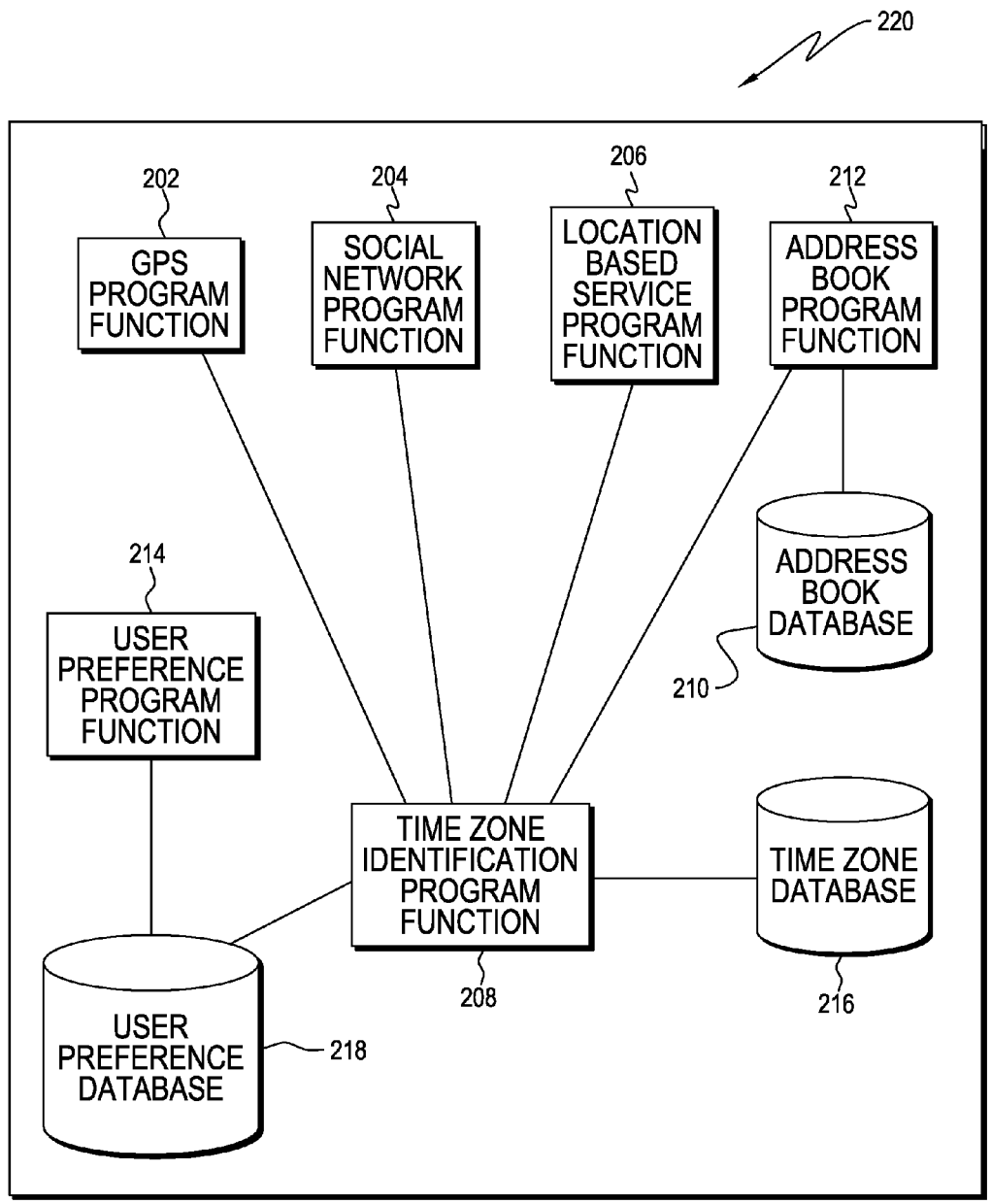
FIG. 2 illustrates program functions of a local time program according to an illustrative embodiment of the invention.

FIG. 2 illustrates program functions of local time program 220 according to an illustrative embodiment of the invention. Local time program 220 has various program functions to obtain location information for a contact, including a GPS program function 202, a social network program function 204, a location based service (LPS) program function 206, and an address book program function 212. The term "program function" is used herein to refer to any portion of a computer program that defines a task or goal, and includes within its scope, for example, code modules and other groups of sequential lines of code, an object or object method in an object-oriented program, and sub-programs that may be defined by a programming language and referred to in the narrower context of that programming language as a procedure, function, subroutine or similar term. GPS program function 202 retrieves a current location of target telephone 110 from telephone service provider 106 via global positioning system (GPS) satellite 108. Telephone service provider 106 is able to determine a current location of target telephone 110 via GPS satellite 108. GPS program function 202 retrieves the current location from service provider 106 by communicating with service provider 106 via cell tower 104. Alternatively, given the proper access permission, GPS program function 202 may communicate with target telephone 110 via cell tower 104 to retrieve target telephone's 110 current GPS location.

Social network program function 204 retrieves a contact's current location from social network program 114. A contact's social network profile accessible from social network program 114 includes, among other data, the contact's residence, as defined by the contact. Social network program function 204 may retrieve the contact's current location, such as the contact's residence, from social network program 114 via any suitable means, such as a programming interface. Examples of a programming interface include an application programming interface (API), a web service interface, and a grid service interface. In one example, social network program function 204 may retrieve the contact's current location from the contact's Facebook profile using the Facebook Graph API. Local time program 220 uses the contact's current location to determine the local time zone in the contact's current location. Social network program 114 may also include a contact's time zone, as defined by the contact. Thus, in one example, social network program 204 may retrieve the contact's local time zone directly from social network program 114.

Address book program function 212 retrieves a contact's location information from a file or database, such as address book database 210. Address book database 210 stores contact phone numbers, including area codes. Address book database 210 may also store contact addresses. In one example, address book database 210 stores an identifier of a location of the contact's social network profile. Accordingly, social network program function 204 may retrieve the identifier from address book database 210 before accessing the contact's social network profile.

LBS program function 206 retrieves a contact's current location from LBS provider 116, such as Google Latitude™ or Foursquare®. LBS provider 116 enables a contact to share a current location by updating a central server via a personal computer or a telephone. For example, a contact may "check in" at a location via Foursquare® and share the location with friends or contacts. LBS program function 206 retrieves a contact's current location from LBS provider 116 via any suitable means, such as a programming interface. The current location may then be used to determine a local time in the current location of the contact.

Local time program 220 has a user preference program function 214 for ranking and prioritizing the different methods of GPS program function 202, social network program function 204, LBS program function 206, and address book program function 212 for retrieving location information about a contact or target telephone 110. The reliability and accuracy of GPS program function 202, social network program function 204, LBS program function 206, and address book program function 212 varies depending on different circumstances. For example, a caller may prefer to rely on user-generated location data, such as data retrieved by social network program function 204, LBS program function 206, and address book program function 212, rather than rely on GPS data retrieved by GPS program function 202 if the caller knows that target telephone 110 does not produce accurate GPS data.

Data retrieved from social network program 114 and generated by the contact may be more accurate than data generated by the caller and stored in address book database 210. For example, a caller may not be aware that a contact may have moved to a new address. The contact may have updated a social network profile using social network program 114 with the new address while the caller may not have updated address book database 210 with the contact's new address. On the other hand, a caller may know that a specific contact does not update a social network profile using social network program 114 regularly. Thus, the caller may prefer to rely on address book program function 212 when determining a current location of the specific contact but may prefer to rely on social network program function 204 when determining a current location of other contacts. Furthermore, data generated by the contact and retrieved from LBS provider 116 may be more accurate than data generated by the contact and retrieved from social network program 114. For example, LBS program function 206 may determine that a contact recently updated his location by checking in, via LBS provider 116, at a coffee shop while on a weekend vacation. Thus, even though the contact's social network profile accessible from social network program 114 may be up-to-date with the contact's current home address, the coffee shop may be a more accurate current location of the contact since the contact is on vacation, away from the home address. On the other hand, a caller may know that a specific contact may not utilize LBS provider 116 frequently. Thus, the caller may prefer to rely on social network program function 204 when determining a current location of the specific contact, but may prefer to rely on LBS program function 206 when determining a current location of other contacts. Accordingly, the caller may utilize user preference program function 214 to define how local time program 220 obtains location information of a contact or target telephone 110.

Local time program 220 has a file or database, such as user preference database 218, to store a caller's preferences, obtained by user preference program function 214, for how to obtain a contact's location information, and in turn the local time in the contact's current location. User preference database 218 may store one set of preferences, applicable to all contacts. User preference database 218 may also store preferences according to individual contacts or groups of contacts. For example, a caller may choose to give higher priority to address book program function 212 for obtaining location information of business contacts while choosing to give a higher priority to social network program function 204 for obtaining location information of personal contacts. Thus, a caller may rank the various methods for obtaining a contact's location information according the caller's preference. The user may include any number of methods for obtaining a contact's location information in the rankings. In one example, if local time program 220 is unable to obtain a contact's location information via the user's top ranked method, local time program 220 uses the user's next ranked method(s) until local time program obtains the contact's location information or all ranked methods have been exhausted. In one example, if the user does not rank any methods or if local time program 220 is unable to obtain a contact's location information via the user's ranked methods, local time program 220 uses a default method to obtain the contact's location information. Alternatively, in one example, local time program 220 may generate a warning, prior to placing a call to a contact, indicating that the contact's location is not known.

Local time program 220 has a time zone identification program function 208 to select location information obtained by one of GPS program function 202, social network program function 204, LBS program function 206, and address book program function 212, based on preferences stored in user preference database 218, to determine the time zone in the current location of the contact based on the location information, and to calculate the local time in the time zone. Alternatively, time zone identification program function 208 may use an area code entered by a caller manually to determine a time zone and calculate a local time. Local time program 220 has a file or database, such as time zone database 216, for storing time zones for different area codes and/or locations. Time zone identification program function 208 accesses time zone database 216 to determine a time zone of a contact, based on a retrieved area code or current location. Alternatively, time zone identification program function 208 may access external time zone database 118, via network 112, to determine a time zone in a current location of a contact, based on a retrieved area code or location.

While in FIG. 2, GPS program function 202, social network program function 204, LBS program function 206, time zone identification program function 208, address book program function 212, and user preference program function 214, as well as address book database 210, time zone database 216, and user preference database 218 are shown as integrated within local time program 220, one of skill in the art will appreciate that, in other embodiments, some or all of GPS program function 202, social network program function 204, LBS program function 206, time zone identification program function 208, address book program function 212, and user preference program function 214 as well as address book database 210, time zone database 216, and user preference database 218 are not integrated within, but are standalone computer programs that communicate with, local time program 220. One of skill in the art will further appreciate that, in another embodiment, GPS program function 202, social network program function 204, LSB program function 206, time zone identification program function 208, address book program function 212, and user preference program function 214, as well as address book database 210, time zone database 216, and user preference database 218 are standalone computer programs and databases on telephone 102, and telephone 102 is devoid of local time program 220.

Figure 3:
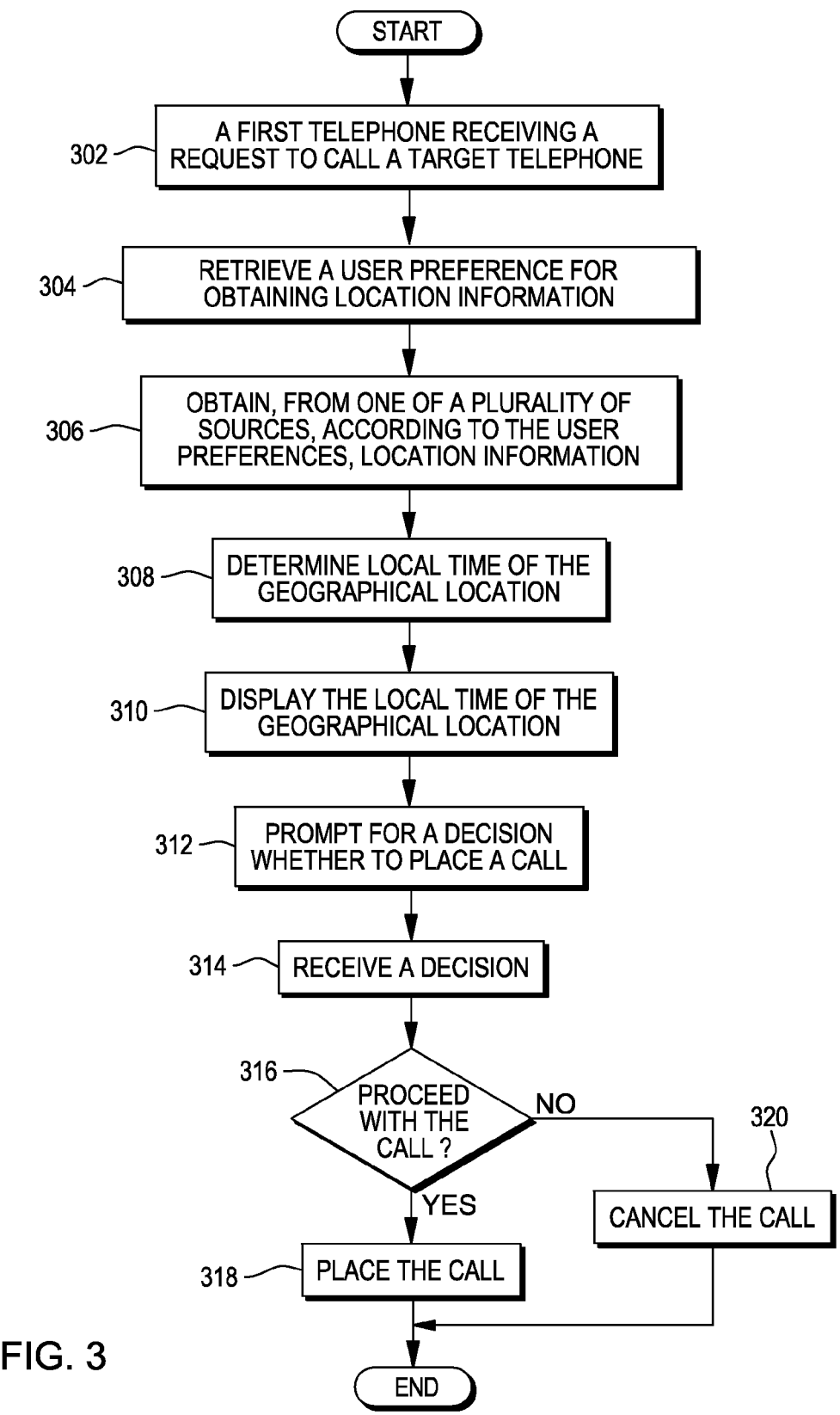
FIG. 3 is a flow chart of a method for determining a local time in a location of a target telephone when placing a call to the target telephone, according to an illustrative embodiment of the invention.

FIG. 3 is a flow chart of a method for determining a local time in a location of a target telephone when placing a call to the target telephone, according to an illustrative embodiment of the invention. At step 302, local time program 220 receives a request to call target telephone 110. At step 304, local time program 220 retrieves, from user preference database 218, a user preference for obtaining location information of target telephone 110 or of a contact associated with target telephone 110. A user preference identifies and prioritizes sources to be used in determining a geographic location of target telephone 110 or of a contact associated with target telephone 110.

At step 306, local time program 220 obtains, from one or more sources, according to the user preference, location information of target telephone 110 or of a contact associated with target telephone 110. Sources for obtaining location information of a telephone (or a contact the telephone is associated with) include telephone service provider 106 via GPS satellite 108, social network program 114, LBS provider 116, or meta-data stored in the telephone such as address book stored in address book database 210. It should be understood that, for the purposes of this disclosure, target telephone 110 is assumed to be located in the same location as the contact associated with target telephone 110. Thus, if local time program 220 obtains a contact's location information from social network program 114, for example, the obtained location information indicates the location of target telephone 110 as well.

Local time program 220 accesses one or more of the sources according to a priority preference defined by a user and stored in user preference database 218. For example, if local time program 220 attempts to obtain location information via a first source defined by a user as having the highest priority but is not successful, local time program 220 proceeds by attempting to obtain location information via a second source defined by the user as having the next highest priority. If local time program 220 is unsuccessful at obtaining location information via the second source, local time program 220 checks each source at each next highest priority level until the earlier of local time program 220 obtaining the location information or local time program 220 checking all of the prioritized sources. In one example, if a user does not specify a preference for a particular source, local time program 220 uses a default source. In one example, if after checking through all available sources without successfully obtaining location information, local time program 220 generates an error message, notifying the caller accordingly.

At step 308, local time program 220 determines the local time in the geographical location of target telephone 110 identified from the location information obtained at step 306. In one embodiment, local time program 220 accesses internal time zone database 216 to determine the local time. In another embodiment, local time program 220 accesses external time zone database 118 via network 112 to determine the local time in the geographical location of target telephone 110. In one example, local time program 220 retrieves time zone information in the form of an offset from the Coordinated Universal Time (UTC). For example, local time program 220 may retrieve time zone information in the form of "UTC-09:00." Local time program 220 may then calculate the difference between the local time zone of the location of telephone 102 and the retrieved time zone and add the difference to the local time in the geographical location of target telephone 110. In one example, local time program 220 may retrieve the local time in the geographical location of target telephone 110 directly, without requiring further calculation. For example, local time program 220 may access a web application that provides a local time, given a zip code or an area code.

At step 310, local time program 220 displays, on telephone 102, the local time in the geographical location of target telephone 110.

At step 312, local time program 220 prompts a caller for a decision whether to continue to place the call to target telephone 110. The prompt includes an option to cancel the call if the caller should decide that it's not a good time to call the contact associated with target telephone 110, based on the displayed local time in the geographical location of target telephone 110.

At step 314, local time program 220 receives a decision in response to the prompt given at step 312. A caller makes a decision by pressing either continue button 126 or cancel button 128. In an example embodiment, the caller may make a decision by speaking into a microphone in telephone 102.

If local time program 220 receives a decision from a caller to proceed with the call (decision 316, yes branch), then local time program 220 directs telephone 102 to place the call to target telephone 110 at step 318. If local time program 220 receives a decision from a caller not to proceed with the call (decision 316, no branch), then local time program 220 cancels the call at step 320.

Figure 4:
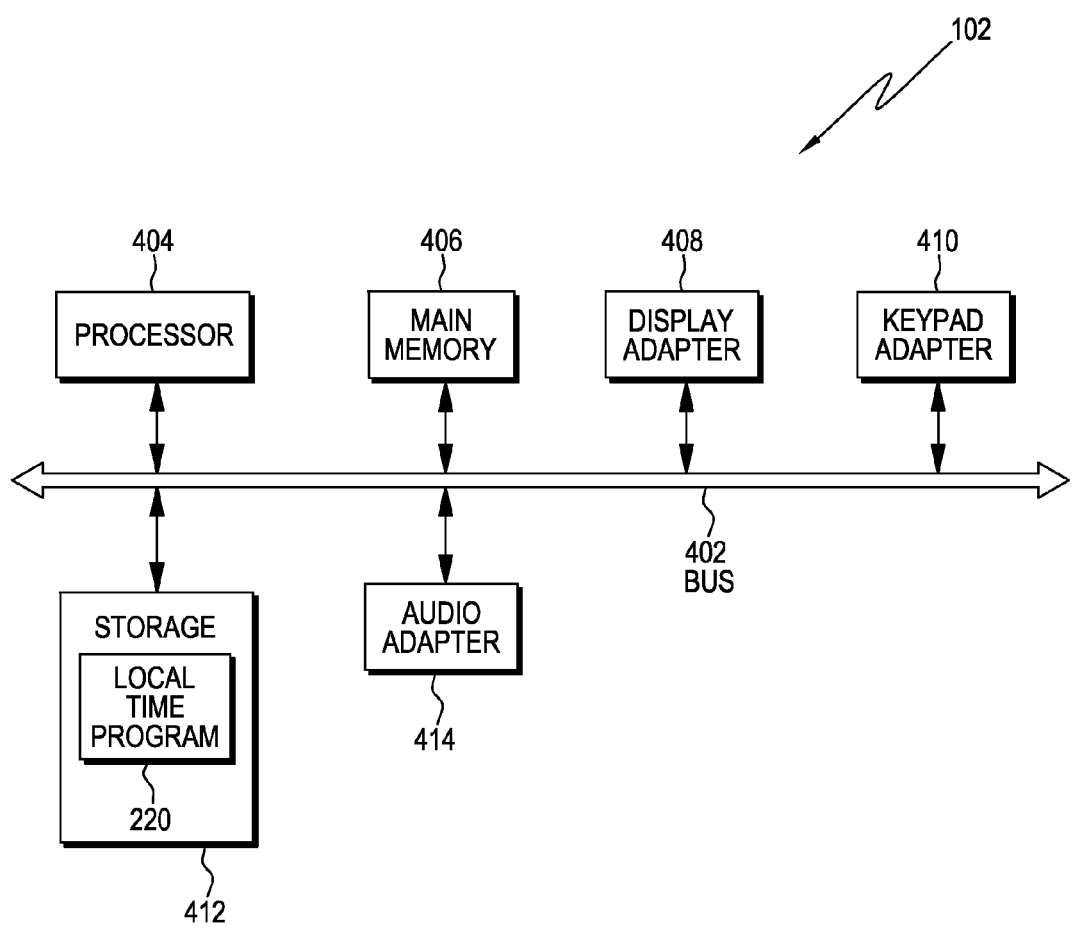
FIG. 4 is a block diagram of a telephone according to an illustrative embodiment of the invention.

FIG. 4 is a block diagram of telephone 102 according to an illustrative embodiment of the invention. Telephone 102 includes a bus 402 to which a processor 404 and a main memory 406 are connected. Display adapter 408, keypad adapter 410, storage 412, and audio adapter 414 also are connected to bus 402. Further, display adapter 408 also includes a mechanism to receive user input when a touch screen display is employed.

An operating system runs on processor 404 and is used to coordinate and provide control of various components within telephone 102 in FIG. 4. The operating system may be, for example, a commercially available operating system such as Microsoft Windows Mobile, Apple iOS, or Blackberry OS. Instructions for the operating system, applications, or programs such as local time program 220 may be located on one or more computer readable storage devices, such as storage 412, for execution by one or more processors, such as processor 404, via one or more computer readable memories, such as main memory 406.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4.

Figure 5:
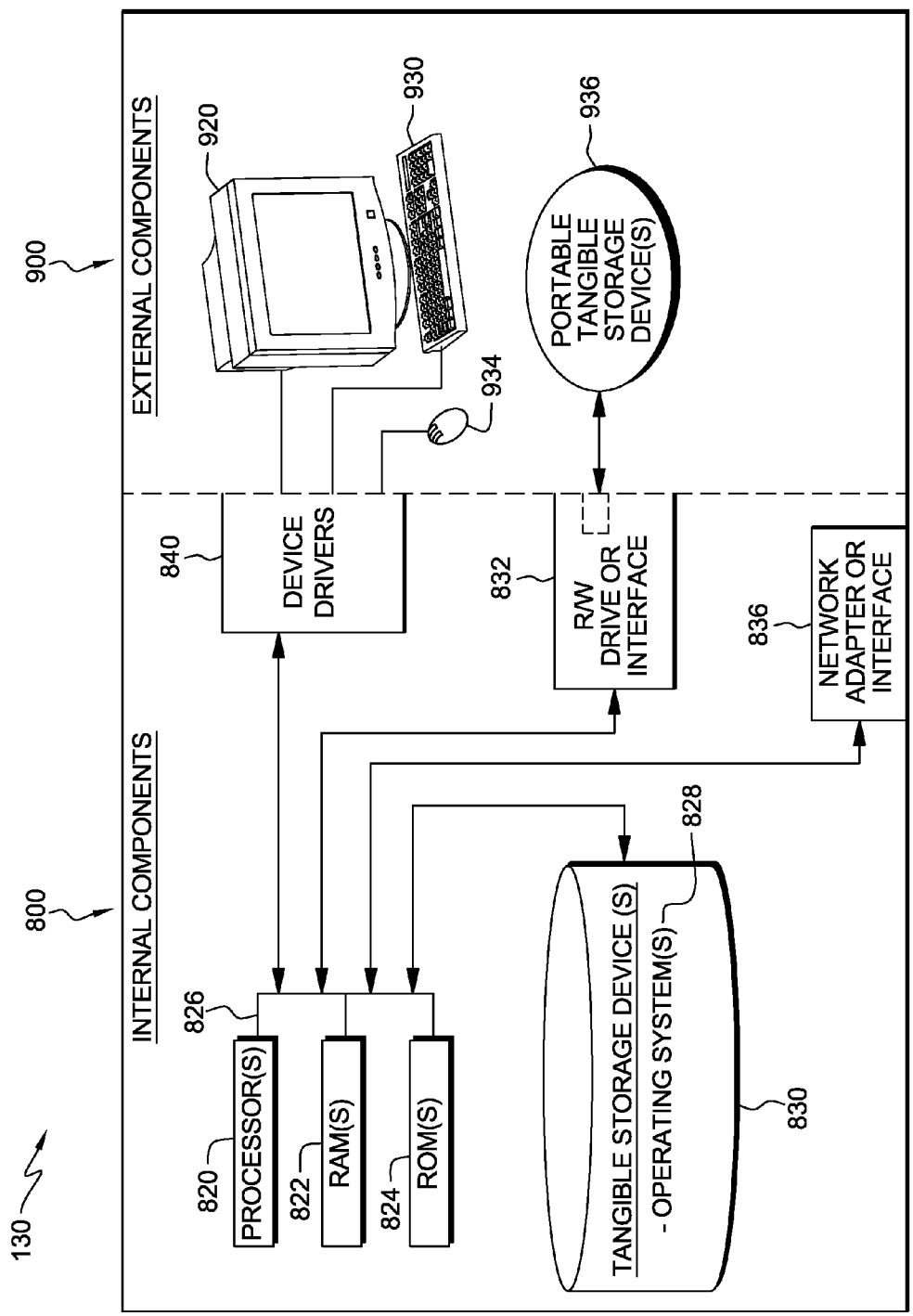
FIG. 5 illustrates hardware and software components of a computer according to an illustrative embodiment of the invention.

FIG. 5 illustrates hardware and software components of computer 130 of FIG. 1. Computer 130 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828 and local time program 220 including GPS program function 202, social network program function 204, location based service program function 206, address book program function 212, user interface program function 214, and time zone identification program function 208 are stored on at least one or more of the computer-readable tangible storage devices 830 for execution by at least one or more of the processors 820 via at least one or more of the RAMs 822 (which typically include cache memory). Address book database 210, time zone database 216, and user preference database 218 are also stored on at least one or more of the computer-readable tangible storage devices 830. In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. Local time program 220 including GPS program function 202, social network program function 204, location based service program function 206, address book program function 212, user interface program function 214, and time zone identification program function 208 can be stored on at least one or more of the portable computer-readable tangible storage devices 936, read via R/W drive or interface 832 and loaded into at least one of one or more computer-readable tangible storage devices 830.

Internal components 800 also include a network adapter or interface 836 such as a TCP/IP adapter card. Local time program 220 including GPS program function 202, social network program function 204, location based service program function 206, address book program function 212, user interface program function 214, and time zone identification program function 208 can be downloaded to computer 130 from an external computer via a network (for example, the Internet, a local area network or other, wide area network) and network adapter or interface 836. From the network adapter or interface 836, local time program 220, including GPS program function 202, social network program function 204, location based service program function 206, address book program function 212, user interface program function 214, and time zone identification program function 208, are loaded into at least one of one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Local time program 212, including GPS program function 202, social network program function 204, location based service program function 206, address book program function 212, user interface program function 214, and time zone identification program function 208, can be written in various programming languages including low-level, high-level, object-oriented or non object-oriented languages. Alternatively, the functions of local time program 212, including GPS program function 202, social network program function 204, location based service program function 206, address book program function 212, user interface program function 214, and time zone identification program function 208, can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for placing a telephone call, the method comprising the steps of:
 a first telephone receiving a request to call a second telephone;
 the first telephone obtaining location information of the second telephone from a social network program, wherein the social network program accesses a user profile on a social network, the user profile including contact residence data;
 the first telephone determining a local time in a geographical location identified from the location information;
 the first telephone displaying the local time; and
 the first telephone prompting for a decision whether to place the call to the second telephone.

2. The method of claim 1, further comprising the steps of:
 the first telephone receiving an input of the decision;
 the first telephone determining, based on the received input of the decision, to place the call to the second telephone; and
 the first telephone placing the call to the second telephone.

3. The method of claim 1, further comprising the steps of:
 the first telephone receiving an input of the decision;
 the first telephone determining, based on the received input of the decision, to cancel the call to the second telephone; and
 the first telephone canceling the call to the second telephone.

4. The method of claim 1, further comprising the steps of:
 the first telephone receiving a user preference for obtaining the location information of the second telephone; and
 the first telephone storing the user preference.

5. An apparatus for placing a telephone call, the apparatus comprising:
 one or more processors, one or more computer-readable memories, and one or more computer-readable tangible storage devices;
 program instructions, stored on at least one of the one or more storage devices for execution by at least one of the one or more processors via at least one of the one or more memories, to receive a request to call a telephone;
 program instructions, stored on at least one of the one or more storage devices for execution by at least one of the one or more processors via at least one of the one or more memories, to obtain location information of the telephone from a social network program, wherein the social network program accesses a user profile on a social network, the user profile including contact residence data;
 program instructions, stored on at least one of the one or more storage devices for execution by at least one of the one or more processors via at least one of the one or more memories, to determine a local time in a geographical location identified from the location information;
 program instructions, stored on at least one of the one or more storage devices for execution by at least one of the one or more processors via at least one of the one or more memories, to display the local time; and program instructions, stored on at least one of the one or more storage devices for execution by at least one of the one or more processors via at least one of the one or more memories, to prompt for a decision whether to place the call to the telephone.

6. The apparatus of claim 5, further comprising:
program instructions, stored on at least one of the one or more storage devices for execution by at least one of the one or more processors via at least one of the one or more memories, to receive an input of the decision;
program instructions, stored on at least one of the one or more storage devices for execution by at least one of the one or more processors via at least one of the one or more memories, to determine, based on the received input of the decision, to place the call to the telephone; and
program instructions, stored on at least one of the one or more storage devices for execution by at least one of the one or more processors via at least one of the one or more memories, to place the call to the telephone.

7. The apparatus of claim 5, further comprising:
program instructions, stored on at least one of the one or more storage devices for execution by at least one of the one or more processors via at least one of the one or more memories, to receive an input of the decision;
program instructions, stored on at least one of the one or more storage devices for execution by at least one of the one or more processors via at least one of the one or more memories, to determine, based on the received input of the decision, to cancel the call to the telephone; and
program instructions, stored on at least one of the one or more storage devices for execution by at least one of the one or more processors via at least one of the one or more memories, to cancel the call to the telephone.

8. The apparatus of claim 5, further comprising:
program instructions, stored on at least one of the one or more storage devices for execution by at least one of the one or more processors via at least one of the one or more memories, to receive a user preference for obtaining the location information of the telephone; and
program instructions, stored on at least one of the one or more storage devices for execution by at least one of the one or more processors via at least one of the one or more memories, to store the user preference.

9. A computer program product for placing a telephone call, the computer program product comprising:
one or more computer readable tangible storage devices;
program instructions, stored on at least one of the one or more storage devices, to receive a request to call a telephone;
program instructions, stored on at least one of the one or more storage devices, to obtain the location information of the telephone from a social network program, wherein the social network program accesses a user profile on a social network, the user profile including contact residence data;
program instructions, stored on at least one of the one or more storage devices, to determine a local time in a geographical location identified from the location information;
program instructions, stored on at least one of the one or more storage devices, to display the local time; and
program instructions, stored on at least one of the one or more storage devices, to prompt for a decision whether to place the call to the telephone.

10. The computer program product of claim 9, further comprising:
program instructions, stored on at least one of the one or more storage devices, to receive an input of the decision;
program instructions, stored on at least one of the one or more storage devices, to determine, based on the received input of the decision, to place the call to the telephone; and
program instructions, stored on at least one of the one or more storage devices, to place the call to the telephone.

11. The computer program product of claim 9, further comprising:
program instructions, stored on at least one of the one or more storage devices, to receive an input of the decision;
program instructions, stored on at least one of the one or more storage devices, to determine, based on the received input of the decision, to cancel the call to the telephone; and
program instructions, stored on at least one of the one or more storage devices, to cancel the call to the telephone.

12. The computer program product of claim 9, further comprising:
program instructions, stored on at least one of the one or more storage devices, to receive a user preference for obtaining the location information of the telephone; and
program instructions, stored on at least one of the one or more storage devices, to store the user preference.

* * * * *